(12) United States Patent
Pusl, III et al.

(10) Patent No.: US 10,447,335 B2
(45) Date of Patent: *Oct. 15, 2019

(54) METHODS FOR OPERATING RADIO FREQUENCY DEVICES HAVING TRANSMIT LOOPBACK FUNCTIONALITY

(71) Applicant: Skyworks Solutions, Inc., Woburn, MA (US)

(72) Inventors: Joseph Anton Pusl, III, Encinitas, CA (US); Craig Joseph Christmas, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,308

(22) Filed: Mar. 8, 2018

(65) Prior Publication Data

US 2018/0262231 A1 Sep. 13, 2018

Related U.S. Application Data

(60) Provisional application No. 62/470,986, filed on Mar. 14, 2017, provisional application No. 62/469,684, filed on Mar. 10, 2017.

(51) Int. Cl.
*H04B 1/48* (2006.01)
*H04B 1/04* (2006.01)
*H04B 1/40* (2015.01)
*H04B 1/525* (2015.01)

(52) U.S. Cl.
CPC ............. *H04B 1/48* (2013.01); *H04B 1/04* (2013.01); *H04B 1/40* (2013.01); *H04B 1/525* (2013.01); *H04B 2001/0425* (2013.01)

(58) Field of Classification Search
CPC . H04B 1/48; H04B 1/525; H04B 1/40; H04B 1/04; H04B 2001/0425
USPC .................................... 455/83, 78
See application file for complete search history.

(56) References Cited

U.S. PATENT DOCUMENTS

2012/0257656 A1* 10/2012 Kang ............... H04B 1/525
375/221
2015/0055733 A1* 2/2015 Asano .............. H04B 1/525
375/297

* cited by examiner

*Primary Examiner* — Eugene Yun
(74) *Attorney, Agent, or Firm* — Knobbe, Martens, Olson & Bear, LLP

(57) ABSTRACT

A front end module having transmit loopback functionality may be operated by conducting a loopback signal from an output of a power amplifier to a receive port on a transmit loopback path and conducting a radio frequency receive signal from an antenna port to the receive port on a receive path. The transmit loopback path includes a first switch coupled between the output of the power amplifier and the receive port. The receive path includes a second switch coupled between the antenna port, where the receive port and is without the first switch.

19 Claims, 8 Drawing Sheets

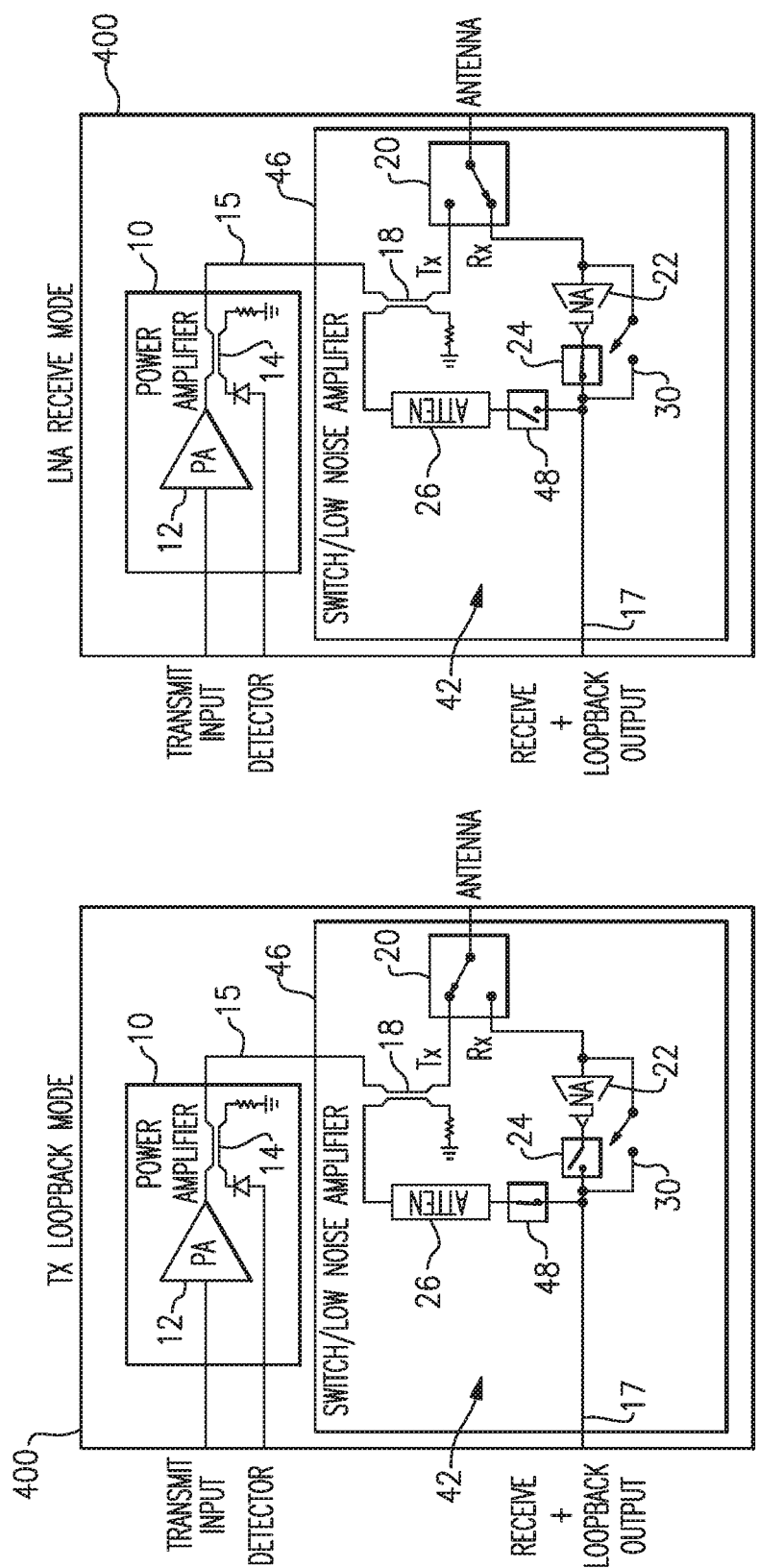

METHODS FOR OPERATING RADIO FREQUENCY DEVICES HAVING TRANSMIT LOOPBACK FUNCTIONALITY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

In the digital pre-distortion power amplifier transmit portion of radio frequency devices, the transmit output power can be sampled at the output of the power amplifier and then fed back to the receiver output for signal processing in the radio frequency transceiver/baseband/system-on-a-chip. The sampled signal can then be manipulated at baseband with digital signal processing such that a pre-distorted version of the transmit radio frequency signal fed to the input of the power amplifier results in a final power amplifier output with low distortion properties.

SUMMARY

The radio frequency path from the output of the power amplifier to the receiver input can be referred to as the transmit loopback path. In certain embodiments, the present disclosure relates to a method of operating a front end module having transmit loopback functionality. the method comprises conducting on a transmit loopback path a loopback signal from an output of a power amplifier to a receive port. The transmit loopback path includes a first switch coupled between the output of the power amplifier and the receive port. The method further comprises conducting on a receive path a radio frequency receive signal from an antenna port to the receive port. The receive path includes a second switch coupled between the antenna port and the receive port. The receive path is without the first switch.

In several embodiments, the method further comprises tapping a portion of the transmit loopback signal and attenuating the portion of the transmit loopback signal.

In accordance with certain embodiments, the transmit loopback path and the receive path share a common signal path between the receive port, a first end of the first switch, and a first end of the second switch.

In accordance with certain embodiments, the method further comprises closing the first switch and opening the second switch when the front end module operates in a transmit mode.

In several embodiments, the method further comprises opening the first switch and closing the second switch when the front end module operates in a receive mode.

In certain embodiments, the present disclosure relates to a method of operating a front end module having transmit loopback functionality. The method comprises passing a loopback signal with a first switch in a transmit loopback path to a receive port of the front end module when the front end module is operating in a transmit mode. The first switch is configured to interrupt the transmit loopback path when the front end module is operating in a receive mode. The method further comprises passing a radio frequency receive signal with a second switch in a receive path to the receive port when the front end module is operating the receive mode. The second switch is configured to interrupt the receive path when the front end module is operating in the transmit mode. The receive path is free from the first switch.

In a number of embodiments, the method further comprises tapping a portion of the loopback signal and attenuating the portion of the loopback signal.

In several embodiments, the transmit loopback path and the receive path share a common signal path between the receive port, a first end of the first switch, and a first end of the second switch.

In certain embodiments, the present disclosure relates to a method of operating a front end module having transmit loopback functionality. The method comprises closing a first switch in a transmit loopback path and opening a second switch in a receive path when the front end module is operating a transmit mode. The first switch is configured to pass a loopback signal from an output of a power amplifier to a receive port of the front end module and the second switch configured to interrupt the receive path when the front end module is operating in the transmit mode. The method further comprises opening the first switch in the transmit loopback path and closing the second switch in the receive path when the front end module is operating in a receive mode. The first switch is configured to interrupt the transmit loopback path and the second switch is configured to pass a receive signal from an antenna port of the front end module to the receive port when the front end module is operating in the receive mode. The receive path is independent of the first switch.

In various embodiments, the method further comprises tapping a portion of the loopback signal and attenuating the portion of the loopback signal.

In several embodiments, the transmit loopback path and the receive path share a common signal path between the receive port, a first end of the first switch, and a first end of the second switch.

In certain embodiments, the method further comprises closing a third switch and opening the first and second switches when the front end module operates in a low noise amplifier bypass mode. The third switch is configured to bypass the low noise amplifier and the second switch when the front end module is operating in the low noise amplifier bypass mode.

In accordance with certain embodiments, the transmit loopback path and the receive path share a common signal path between the receive port, a first end of the first switch, a first end of the second switch, and a first end of the third switch.

In certain embodiments, the present disclosure relates to a method of operating a wireless device having transmit loopback functionality. The method comprises transmitting and receiving with an antenna radio frequency signals, amplifying with a power amplifier a radio frequency signal for transmission by the antenna, amplifying with a low noise amplifier a radio frequency signal received by the antenna, and operating in a transmit mode that includes closing a first switch in a transmit loopback path of a front end module and opening a second switch in a receive path of the front end module. The first switch is configured to pass a loopback signal from an output of a power amplifier to a receive port of the front end module. The method further comprises operating in a receive mode that includes opening the first switch in the transmit loopback path and closing the second switch in the receive path. The second switch is configured to pass a receive signal from an antenna port of the front end module to the receive port, the receive path independent of the first switch.

In several embodiments, the radio frequency receive signal does not pass through the first switch.

In accordance with certain embodiments, the method further comprises interrupting the loopback signal path when the front end module is operating in the receive mode.

In accordance with some embodiments, the first switch is configured to interrupt the loopback signal path when the front end module is operating in the receive mode.

In a number of embodiments, the method further comprises interrupting the receive signal path when the front end module is operating is the transmit mode.

In several embodiments, the second switch is configured to interrupt the receive signal path when the front end module is operating in the transmit mode.

In some embodiments, method further comprises splitting with a splitter the radio frequency receive signal for license assist access operation.

In certain embodiments, the present disclosure relates to a front end module having transmit loopback functionality. The front end module comprises a transmit loopback path configured to conduct a loopback signal from an output of a power amplifier to a receive port. The transmit loopback path includes a first switch coupled between the output of the power amplifier and the receive port and a receive path configured to conduct a radio frequency receive signal from an antenna port to the receive port. The receive path includes a second switch coupled between the antenna port and the receive port, where the receive path is without the first switch.

In several embodiments, the front end module the transmit loopback path further includes an attenuator and a coupler.

In accordance with certain embodiments, the transmit loopback path and the receive path share a common signal path between the receive port, a first end of the first switch, and a first end of the second switch.

In accordance with certain embodiments, the first switch is closed and the second switch is open when the front end module operates in a transmit mode.

In accordance with some embodiments, the first switch is open and the second switch is closed when the front end module operates in a receive mode.

In certain embodiments, the present disclosure relates to a front end module having transmit loopback functionality. The front end module comprises a first switch in a transmit loopback path. The first switch is configured to pass a loopback signal to a receive port of the front end module when the front end module is operating in a transmit mode. The first switch is configured to interrupt the transmit loopback path when the front end module is operating in a receive mode. The front end module further comprises a second switch in a receive path. The second switch is configured to pass a radio frequency receive signal to the receive port when the front end module is operating in the receive mode. The second switch is configured to interrupt the receive path when the front end module is operating in the transmit mode. The receive path is free from the first switch.

In a number of embodiments, a wireless device comprises the front end module.

In several embodiments, the transmit loopback path further includes an attenuator and a coupler.

In accordance with a number of embodiments, the transmit loopback path and the receive path share a common signal path between the receive port, a first end of the first switch, and a first end of the second switch.

In some embodiments, a system board for a wireless device comprises the front end module.

In certain embodiments, the present disclosure relates to a front end module having transmit loopback functionality. The front end module comprises a power amplifier configured to amplify a radio frequency signal for transmission by an antenna, a low noise amplifier configured to amplify a radio frequency signal received by the antenna, and a first switch coupled between an output of the power amplifier and a receive port of the front end module. A loopback signal path is formed between the output of the power amplifier and the receive port and is configured to carry a transmit loopback signal. The loopback signal path includes the first switch. The front end module further comprises a second switch coupled between an output of the low noise amplifier and the receive port. A receive signal path is formed between an antenna port of the front end module and the receive port and is configured to carry a radio frequency receive signal. The receive signal path includes the low noise amplifier and the second switch. The receive signal path excludes the first switch.

In a number of embodiments, a wireless device comprises the front end module.

In several embodiments, the loopback signal path and the receive signal path share a common signal path between the receive port, a first end of the first switch, and a first end of the second switch.

In accordance with a number of embodiments, the front end module further comprises a splitter configured to split the radio frequency receive signal for license assist access operation.

In certain embodiments, the present disclosure relates to a wireless device having transmit loopback functionality. The wireless device comprises an antenna configured to transmit and receive radio frequency signals, a power amplifier configured to amplify a radio frequency signal for transmission by the antenna, a low noise amplifier configured to amplify a radio frequency signal received by the antenna, and a front end module having transmit loopback functionality. The front end module includes a first switch coupled between an output of the power amplifier and a receive port of the front end module and a second switch coupled between an output of the low noise amplifier and the receive port. A loopback signal path is formed between the output of the power amplifier and the receive port and is configured to carry a transmit loopback signal. The loopback signal path includes the first switch. A receive signal path is formed between the antenna and the receive port and is configured to carry a radio frequency receive signal. The receive signal path includes the low noise amplifier and the second switch. The receive signal path excluding the first switch.

In various embodiments, the radio frequency receive signal does not pass through the first switch.

In several embodiments, the first switch is configured to interrupt the loopback signal path when the front end module is operating in a receive mode.

In some embodiments, the second switch is configured to interrupt the receive signal path when the front end module is operating is a transmit mode.

In certain embodiments, the wireless device further comprises a splitter configured to split the radio frequency receive signal for license assist access operation.

Certain aspects, advantages, and novel features of the inventions can be described herein. It can be to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

Embodiments of this disclosure will be described, by way of non-limiting example, with reference to the accompanying drawings.

FIG. 4 is a block diagram of a second front end module with a transmit loopback path that is configured to transmit a RF signal, according to certain embodiments.

FIG. 5 is a block diagram of the second front end module configured to receive a RF signal, according to certain embodiments.

DETAILED DESCRIPTION

Figure 1:
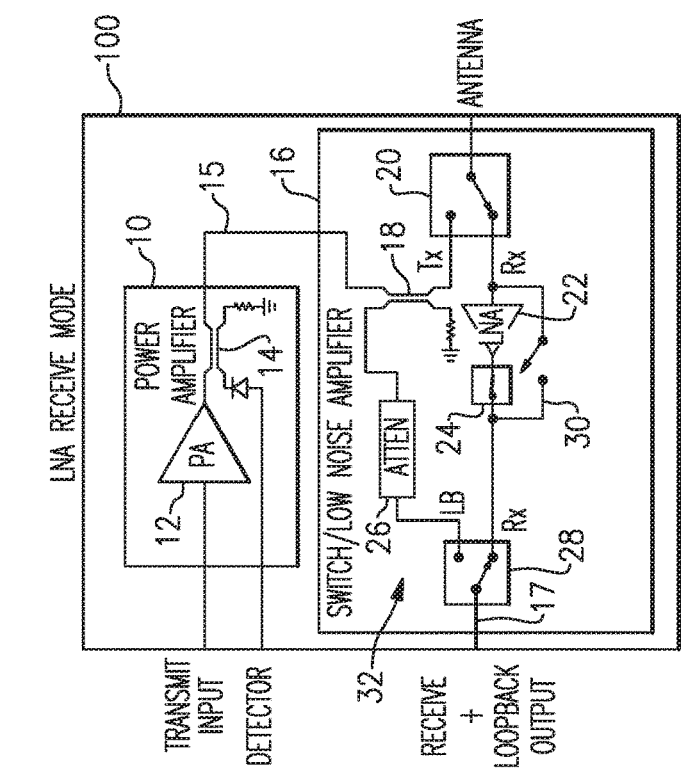
FIG. 1 is a block diagram of a first front end module with a transmit loopback path that is configured to transmit a radio frequency (RF) signal, according to certain embodiments.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Digital predistortion (DPD) is used to linearize the nonlinear response of a power amplifier (PA) over its intended power range. In one embodiment, digital signal processing techniques predistort a baseband signal before modulation, up-conversion and amplification by the power amplifier. The combination of the predistorted response and the power amplifier response produces a more linear power amplifier response than the power amplifier response without the digital predistortion.

A radio frequency or microwave receive/transmit system is comprised of a digital pre-distortion/power amplifier/transmit/receive (DPD/PA/TX/RX) portion and a RF transceiver/baseband portion. The radio frequency or microwave receive/transmit system can be a wireless device, a portable transceiver, a cell phone, a smartphone, tablet, a computer/laptop w/wireless, a pager, a global positioning system, a wireless access point, a Wi-Fi access point, a wearable device, or like device.

In an embodiment, the digital pre-distortion/power amplifier/transmit/receive portion comprises a front end module (FEM) that includes a power amplifier, a low noise amplifier (LNA), and a transmit/receive (TX/RX) switch. In an embodiment, the RF transceiver/baseband portion of the system comprises a system on a chip (SOC).

In the digital pre-distortion/power amplifier/transmit/receive portion of the system, the transmit output power is sampled at the output of the power amplifier and then fed back to the receive output of the front end module for signal processing in the RF transceiver/baseband portion of the system. The RF path from the output of the power amplifier to the receive output is referred to as the transmit loopback path.

The sampled signal is then manipulated at baseband with digital signal processing (DSP) and used, at least in part, to pre-distort the transmit RF signal prior to amplification by the power amplifier and transmission via the antenna. In other words, the pre-distorted transmit RF signal is based at least on the sampled signal. The pre-distorted transmit RF signal is fed to the input of the power amplifier, which results in a power amplifier output with low distortion properties.

FIG. 1 is a block diagram of a front end module 100 with a transmit loopback path 32. As illustrated in FIG. 1, front end module 100 is configured to transmit a radio frequency (RF) signal. Front end module 100 comprises a power amplifier module 10. Power amplifier module 10 comprises a power amplifier 12 and a coupler/detector 14. The upconverted/RF signal is placed at the transmit input to the power amplifier 12. The power amplifier 12 outputs an amplified RF transmit signal. The coupler/detector 14 taps a portion of the power amplifier output signal and sends it to the detector, which converts the RF signal to a direct current (DC) output at the detector output. The detected power level information is used to adjust the power level of the RF transmit signal being input into the power amplifier 12 from the SOC.

Front end module 100 further comprises a TX/RX switch/low noise amplifier module 16. TX/RX switch/low noise amplifier module 16 comprises a coupler 18, a TX/RX switch 20, a low noise amplifier 22, a LNA output switch 24, a LNA bypass switch 30, an attenuator 26, and a receive & loopback switch 28. The TX/RX switch is switched to transmit and couples the amplified transmit signal from the power amplifier 12 to an antenna for transmission. Also during transmitting, the LNA output switch 24 is open, as well as the low noise amplifier bypass switch 30 to prevent the low noise amplifier 22 from operating.

The loopback path 32 in the front end module 100 comprises the output of the power amplifier 12, the coupler 18, the attenuator 26, the receive & loopback switch 28, the receive & loopback output, and the connecting signal routing to a receive & loopback output 17. The coupler 18 comprises a power coupler and taps a portion of the transmit signal power that is intended for the antenna path before the TX/RX switch 20. Attenuator 26 attenuates the coupled power, which is routed to the receive & loopback output 17 of the front end module 100 via the receive & loopback switch 28.

In an embodiment, the receive & loopback switch 28 comprises a single pole double throw (SPDT or SP2T) switch and is placed in the loopback (LB) position when the front end module 100 is in the transmit mode.

Figure 2:
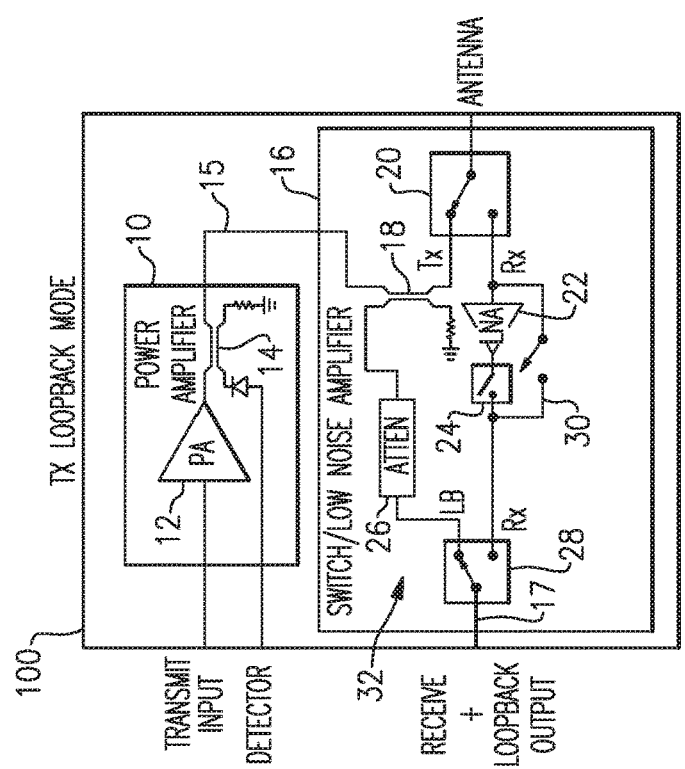
FIG. 2 is a block diagram of the first front end module configured to receive a RF signal, according to certain embodiments.

FIG. 2 is a block diagram of the front end module 100 where the front end module 100 is configured to receive RF signals from the antenna. In the receive mode, the TX/RX switch 20 switched to receive, either the LNA output switch 24 or the LNA bypass switch 30 is in the closed position, and the receive & loopback switch 28 is switched to receive. The RF receive signal is routed from the antenna, through the TX/RX switch 20, and either the LNA bypass switch 30 or the low noise amplifier 22 & LNA output switch 24, depending on which is selected. The RF receive signal is further routed through the receive & loopback switch 28 to the receive & loopback output 17 of the front end module 100.

Figure 3:
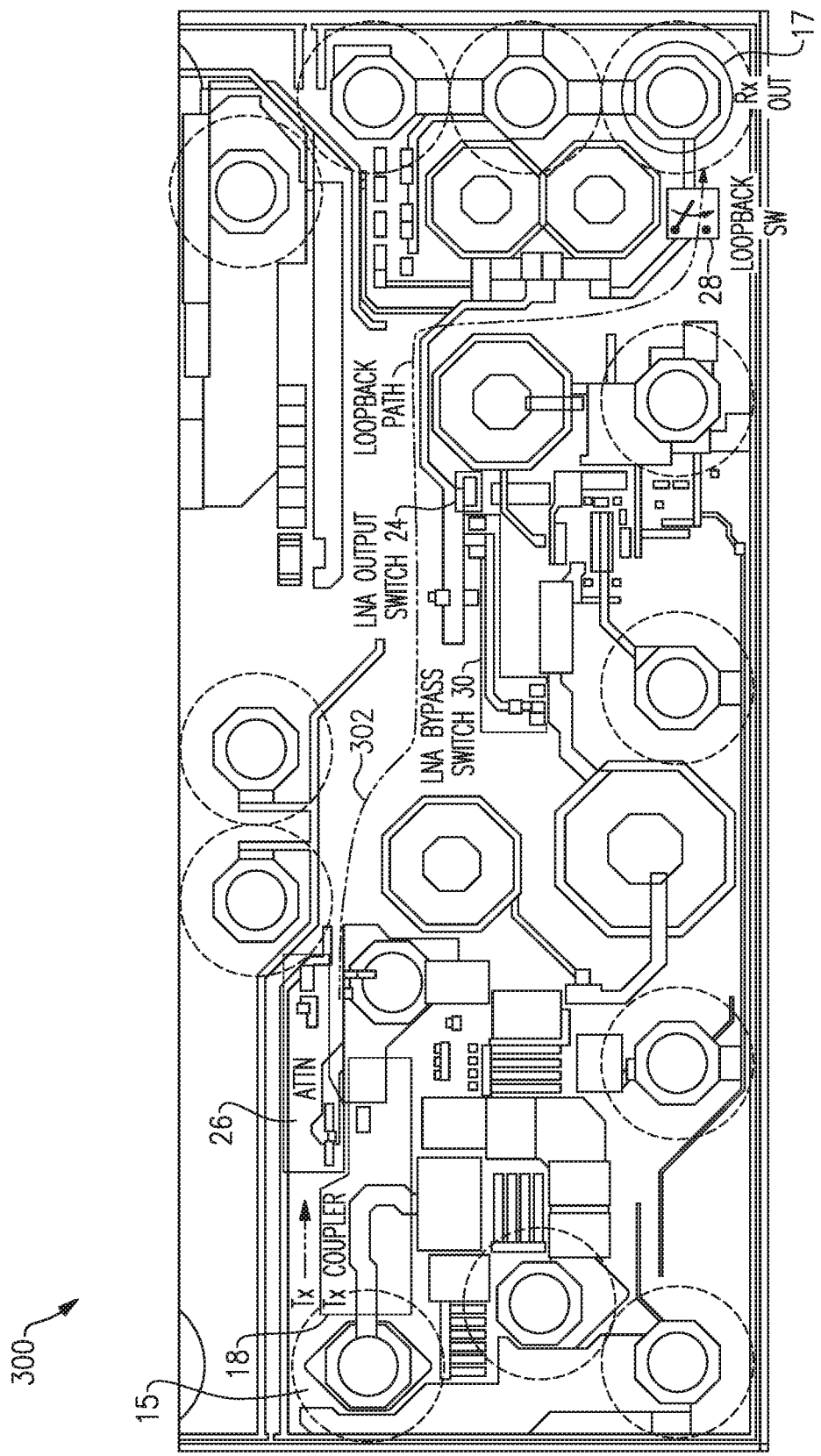
FIG. 3 is an exemplary circuit layout of the first front end module, according to certain embodiments.

FIG. 3 is an exemplary circuit layout 300 of the front end module 100 illustrating a transmit loopback path 302 that begins at the power amplifier output 15. The power amplifier output 15 receives the RF transmit signal from the power amplifier 12. The transmit loopback path 302 further comprises the RF path from the power amplifier output 15, through the attenuator 26, through the loopback switch 26 to the receive & loopback output 17. The transmit loopback path 302 passes near the low noise amplifier output switch 24 and the LNA bypass switch 30. The power amplifier output 15 and the receive & loopback output 17 are at opposite sides of the layout 300 and the transmit loopback path 302 extends across the layout 300 in a diagonal manner.

The receive & loopback switch 28 is in the receive path and switches between the transmit loopback signal from the attenuator 26 when the front end module 100 is transmitting and the receive signal from one of the LNA output switch or the LNA bypass switch 30 when the front end module 100 is receiving.

Implementation on-chip of the transmit loopback path 32, 302 with the loopback path architecture illustrated in FIGS. 1-3 generally has the following issues:

1. The transmit loopback signal travels a long distance and across many other signals in a highly-integrated chip. This is because the locations of the coupler 18 and the receive & loopback output 17 are generally located far from one another for purposes of signal isolation.

2. The receive & loopback switch 28 is added in the receive path to maintain RF impedance matching for the loopback path 32, 302 as well as the receive path.

3. The receive & loopback switch 28 results in increased losses in the receive path.

4. The transmit loopback path linearity is important because for DPD to work properly, an accurate replica of the TX signal at the PA output must be delivered to the RX output and subsequently the SOC for processing. If the TX loopback path is non-linear, the signal delivered will not be an accurate replica of the actual TX signal which is what is desired in the system.

FIGS. 4-8 illustrate embodiments of transmit loopback path architecture that overcome these issues.

FIG. 4 is a block diagram of a front end module 400 with a transmit loopback path 42. In FIG. 4, the frond end module 400 is illustrated in transmit mode and is configured to transmit a RF signal. Front end module 400 comprises the power amplifier module 10 including the power amplifier 12 and the coupler 14. Front end module 400 further comprises a TX/RX switch/low noise amplifier module 46. TX/RX switch/low noise amplifier module 46 comprises the coupler 18, the TX/RX switch 20, the low noise amplifier 22, the LNA output switch 24, the attenuator 26, and a loopback switch 48. The TX/RX switch is switched to transmit and couples the amplified transmit signal from the power amplifier 12 to an antenna for transmission.

The transmit loopback path 42 in the front end module 400 comprises the output of the power amplifier 12, the coupler 18, the attenuator 26, the loopback switch 48, the receive & loopback output 17, and the connecting signal routing. In TX/loopback mode, as illustrated in FIG. 4, the LNA output switch 24 and the LNA bypass switch 30 are both open.

The coupler 18 comprises a power coupler and taps a portion of the transmit signal power that is intended for the antenna path before the TX/RX switch 20. Attenuator 26 attenuates the coupled power, which is routed to the receive & loopback output of the front end module 400 via the loopback switch 48.

FIG. 5 is a block diagram of the front end module 400 where the front end module 400 configured to receive RF signals from the antenna. In the receive mode, the TX/RX switch 20 switched to receive, either the LNA output switch 24 or the LNA bypass switch 30 is in the closed position, and the loopback switch 48 is open.

The RF receive signal is routed from the antenna, through the TX/RX switch 20, and either the LNA bypass path or the low noise amplifier 22 & LNA output switch 24, depending on which is selected, to the receive & loopback output 17 of the front end module 400.

Advantageously, the RF receive signal is not routed through an additional switch, as in the transmit loopback path architecture of front end module 100.

The LNA output switch 24 that is in series with the LNA output already exists for the purpose of LNA bypass mode. Thus, the RF path used for TX/loopback/DPD shares a portion of the already-existing RX path while not adding switches in the receive path for loopback purposes. Advantageously, the loopback signal routing is minimized, receive signal switching and loss are also minimized, and optimum return loss is maintained for both receive and transmit modes of operation.

The architecture of the transmit loopback path 42 solves the problems associated with the transmit loopback path 32. The signal routing on-chip for the transmit loopback path 42 is easier to implement than that of the transmit loopback path 32 because transmit loopback path 42 makes use of a portion of the existing receive signal traces. Newly-added routes are relatively short and therefore also easy to implement.

Good RF impedance matching is maintained for both receive path and the loopback signal path 42 because the RF switches 20, 24, and 48 are placed such that characteristic impedance of each of the receive path and the transmit loopback path 42 is maintained throughout.

There are no additional receive path losses associated with the SPDT receive & loopback switch 28 that is needed at the back end of the receive path for the transmit loopback path 32. The transmit loopback path 42 does not utilize a loopback switch in the receive path.

Figure 6:
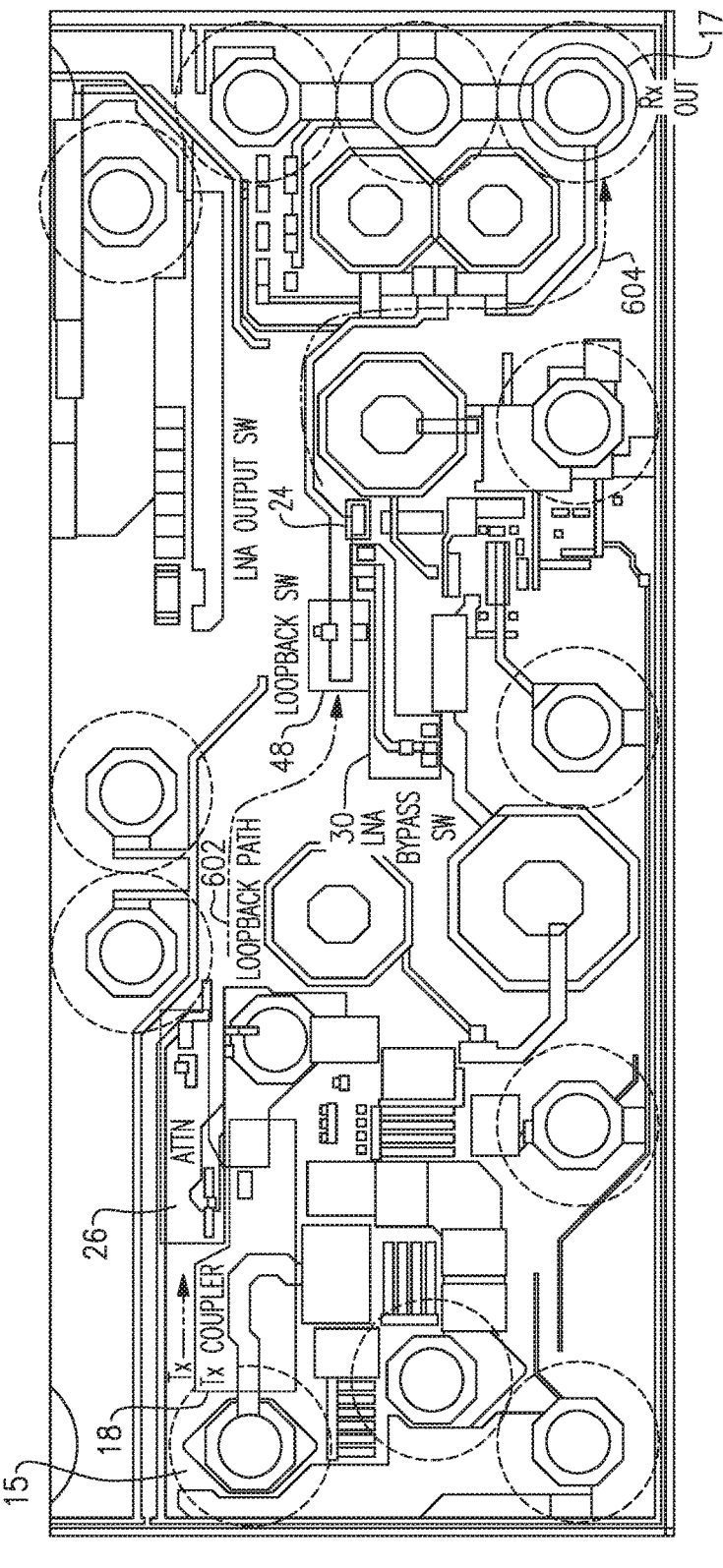
FIG. 6 is an exemplary circuit layout of the second front end module, according to certain embodiments.

FIG. 6 is an exemplary circuit layout 600 of the front end module 400 illustrating a transmit loopback path 602 that begins at the power amplifier output 15. The transmit loopback path 602 further comprises the RF path through attenuator 26 through the loopback switch 48. Layout 600 further illustrates a RF receive path 604. The RF receive path 604 comprises a portion of the RF receive path for the front end module 400 and extends from the low noise amplifier output switch 24 and the LNA bypass switch 30 to the receive & loopback output 17. The loopback switch 48 is not in the RF receive path, but the transmit loopback signal from the output of the loopback switch 48 travels along/shares the RF receive path 604 to the receive & loopback output 17.

The transmit loopback path 602 associated with the front end module 400 is shorter than the transmit loopback path 302 associated with the front end module 100. The transmit loopback path 602 utilizes existing traces and routing on the layout 600. The loopback switch 48 in not in the receive signal path.

Implementation on-chip of the transmit loopback path 42, 602 with the loopback path architecture illustrated in FIGS. 4-6 has the following advantages:

1. The transmit loopback signal travels a shorter distance across the many other signals in a highly-integrated chip. This reduces cross-coupling.

2. The receive & loopback switch 48 not in the receive path. Because the receive & loopback switch 48 not in the receive path, it is not needed to maintain RF impedance matching for the transmit loopback path 42, 602 as well as the receive path.

3. The receive signal does not experience the increased loses that occur with the receive & loopback switch 28 that is in the receive path because the receive & loopback switch 48 is not in the receive path.

4. Linearity of the TX loopback path is unchanged from the previous architecture. This is because all active elements in the RX path are switched out so that they will not affect linearity.

5. The loopback signal travels over a portion of the existing receive path 604. This is an advantage in the layout 600 because separate signal routing does not need to be provided, which simplifies the layout 600. In a highly-integrated IC, it is generally not possible to provide an isolated (desirable) path for the TX loopback due to space constraints and the need to cross over other signal traces. In the previous implementation, illustrated in FIG. 3, the TX loopback path is inevitably compromised due to space constraints, other signal routes that are in the way, and the large distance that the signal travels. Being able to re-use a portion of the existing RF signal path is a distinct advantage.

Figures 7, 8:
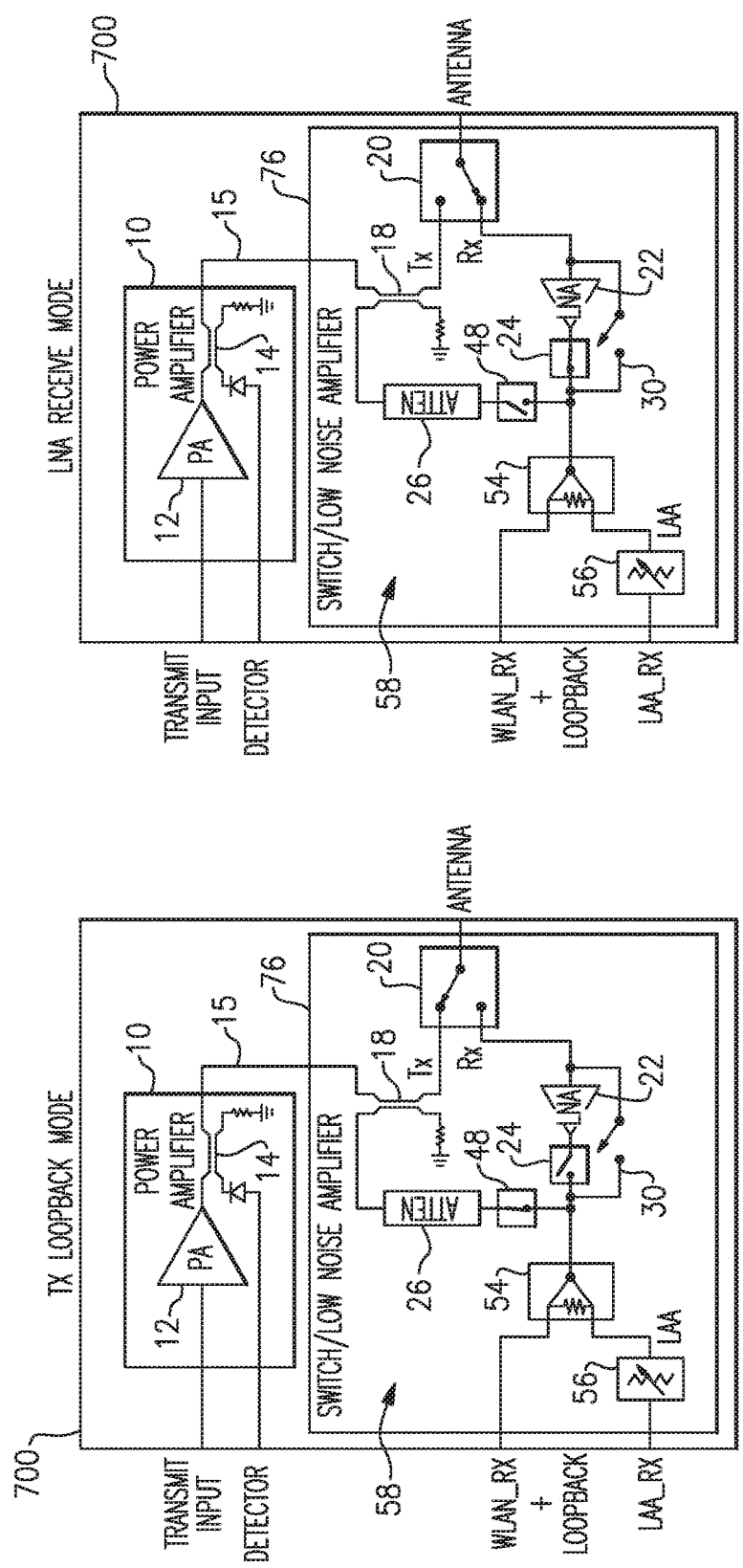
FIG. 7 is a block diagram of a third front end module with a transmit loopback path that is configured to transmit a RF signal, according to certain embodiments.
FIG. 8 is a block diagram of the third front end module configured to receive a RF signal, according to certain embodiments.

FIGS. 7 and 8 illustrate another embodiment of the transmit loopback architecture for a front end module 700 with a transmit loopback path 58, where front end module 700 utilizes Wi-Fi and LTE-LAA (licensed assess assist) functionality. FIG. 7 illustrates the front end module 700 in TX/loopback mode. The transmit loopback path 58 is similar to the transmit loopback path 42 except the transmit loopback path 58 further includes a splitter 54 and the transmit loopback signal is routed through a TX/RX switch/low noise amplifier module 76 from the output of the power amplifier 12, through the coupler 18, the attenuator 26, the loopback switch 48, the splitter 54 to the WLAN-RX & loopback output of the front end module 700. LAA RX is disabled when the front end module 700 is in Wi-Fi transmit mode.

FIG. 8 illustrates the front end module 700 in receive mode. The antenna receives the RF signal. The RF receive signal travels through the TX/RX switch 20 to either the LNA bypass switch 30 or the low noise amplifier 22 and LNA output switch to the splitter 54. The splitter 54 sends a portion of the RF receive signal to the WLAN-RX & loopback output and a portion to the LAA-RX output, depending on the frequencies of the RF receive signal.

The receive path does not include an additional switch, such as the receive & loopback switch 28, in the receive path. Thus, the transmit loopback path 58 provides the same advantages discussed above with respect to the transmit loopback path 42.

In an embodiment, front end modules 400, 700 communicate with logic arbitrator circuitry that controls the operation of one or more of the loopback switch 48, the TX/RX switch 20, the LNA output switch 24 and the LNA bypass switch 30.

In an embodiment, the front end modules 400, 700 comprise remote 5 GHz FEM modules. In other embodiments, the front end modules 400, 700 can operate from low-MHz to high-GHz frequency ranges.

In an embodiment, the front end module 400, 700 comprises the power amplifier module 10 and the TX/RX switch/LNA module 46, 76. In an embodiment, the power amplifier module 10 is implemented using GaAs HBT and the TX/RX switch/LNA module 46, 76 is implemented using silicon on insulator (SOI) in a chip scale package (CSP). In other embodiments, the front end modules 400, 700 can be implemented using different technologies, such as, but not limited to Si, SiGe, MOS, BJT, HBT, pHEMT, GaN, GaAs, InGaP GaAs HBT, MOSFET, SOI, Bulk CMOS, CMOS, and the like. The Switch/LNA and PA functions may be implemented as separate chips or as a single highly-integrated IC.

Figure 9A:
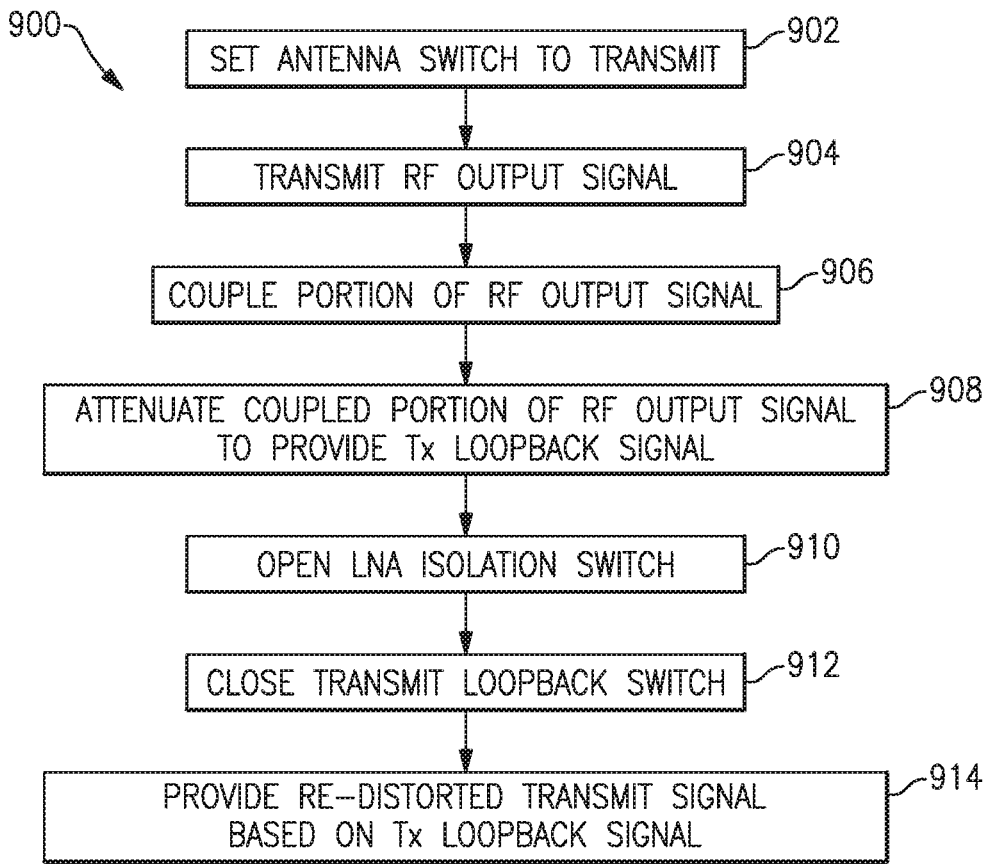
FIG. 9A is a flowchart illustrating a transmit process with loopback functionality, according to certain embodiments.

The methods and apparatus described herein provide front end modules 400, 700 with transmit/loopback functionality. FIG. 9A is a flowchart illustrating a transmit/loopback process 900 for a wireless device comprising the front end module 400, 700. At step 902, the process 900 sets the TX/RX switch 20 to transmit. In an embodiment, a logic arbitrator controlled by baseband processing controls the switches.

At step 904, the front end module 400, 700 transmits the RF transmit signal. At step 906, the coupler 18 taps a portion of the RF transmit signal. At step 908, the attenuator 26 attenuates the portion of the RF transmit signal to generate the transmit loopback signal. At step 910, the process 900 opens the LNA output switch 24 and the LNA bypass switch 30. At step 912, the process 900 closes the transmit loopback switch 48 to provide the transmit loopback signal to the receive & loopback output 17 of the front end module 400, 700.

At step 914, the wireless device provides a pre-distorted transmit signal to the power amplifier 12, where the pre-distorted transmit signal is based at least in part on the transmit loopback signal.

Figure 9B:
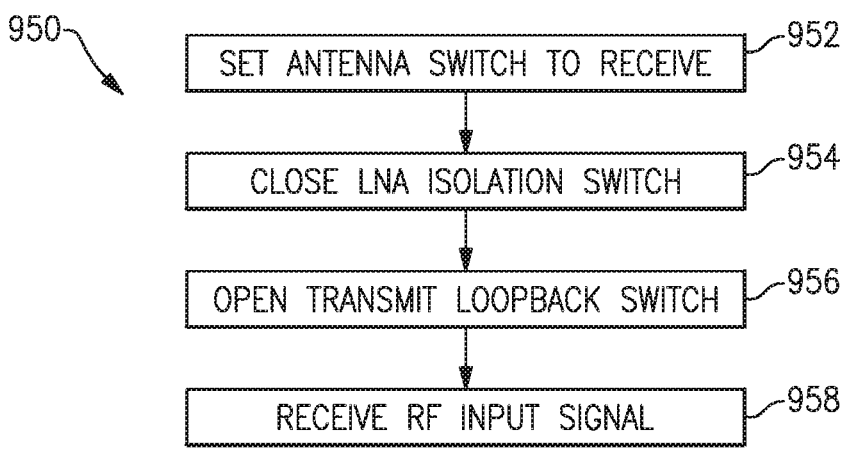
FIG. 9B is a flowchart illustrating a receive process, according to certain embodiments.

FIG. 9B is a flowchart illustrating a receive process 950. At step 952, the process 950 sets the TX/RX switch 20 to receive. At step 954, the process 950 closes the LNA output switch 24 or the LNA bypass switch 30. At step 965, the process 950 opens the loopback switch 48 and the RF receive signal travels through the TX/RX switch 20, either the path defined by the low noise amplifier 22 and LNA output switch 24 or the path defined by the LNA bypass switch 30 to the receive & loopback output 17 of the front end module 400, 700.

Figure 10A:
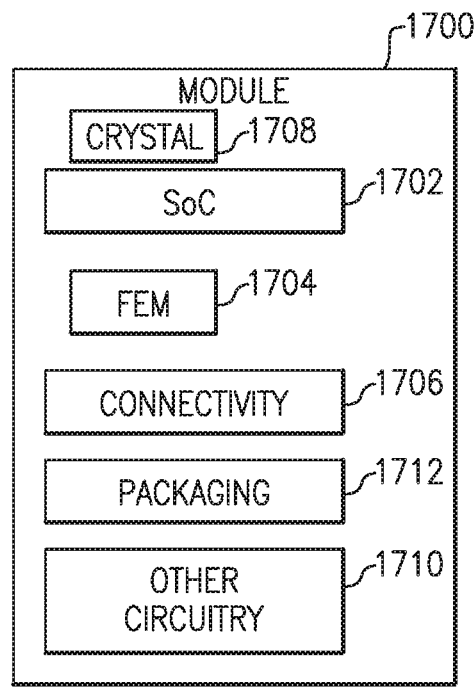
FIG. 10A is an exemplary block diagram of a module for use in a wireless device, according to certain embodiments.

FIG. 10A is an exemplary block diagram of a module 1700 for use in a wireless device, according to an embodiment. Module 1700 comprises a front end module (FEM) or front end integrated circuit (FEIC) 1704 that includes the front end module 400, 700 with transmit/loopback functionality. Module 1700 further comprises one or more of a crystal 1708, a system on a chip (SoC) 1702, connectivity 1706 to provide signal interconnections, packaging 1712, such as for example, a package substrate, for packaging of the circuitry, and other circuitry 1710, such as, for example, load capacitors associated with the crystal 1708, pre-filters, post filters modulators, demodulators, down converters, and the like, as would be known to one of skill in the art of semiconductor fabrication in view of the disclosure herein. In an embodiment, the module 1700 comprises a solution in a package (Si P).

Figure 10B:
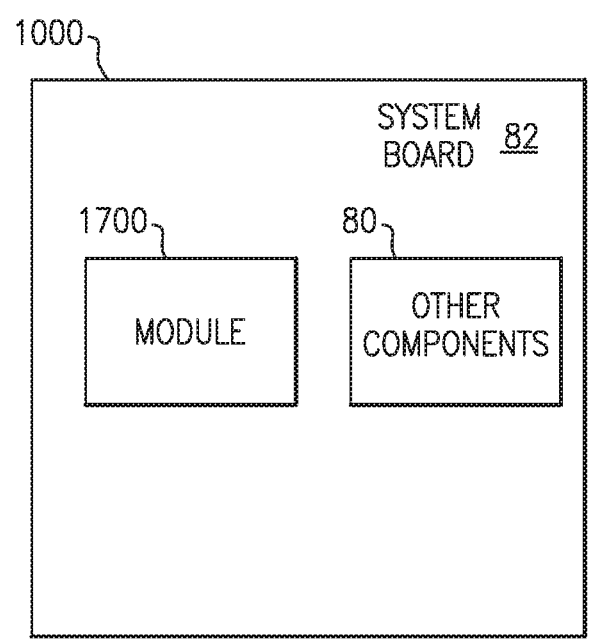
FIG. 10B is an exemplary block diagram of a system board assembly with a front end module including transmit loopback and other components disposed on a system board, according to certain embodiments.

FIG. 10B is an exemplary block diagram of a system board assembly 1000 with the module 1700 that includes the front end module with transmit/loopback functionality 400, 700 and other component(s) 80 disposed on a system board 82, according to an embodiment. The system board 82 can be any suitable application board, such as a phone board for a mobile phone.

Figure 11:
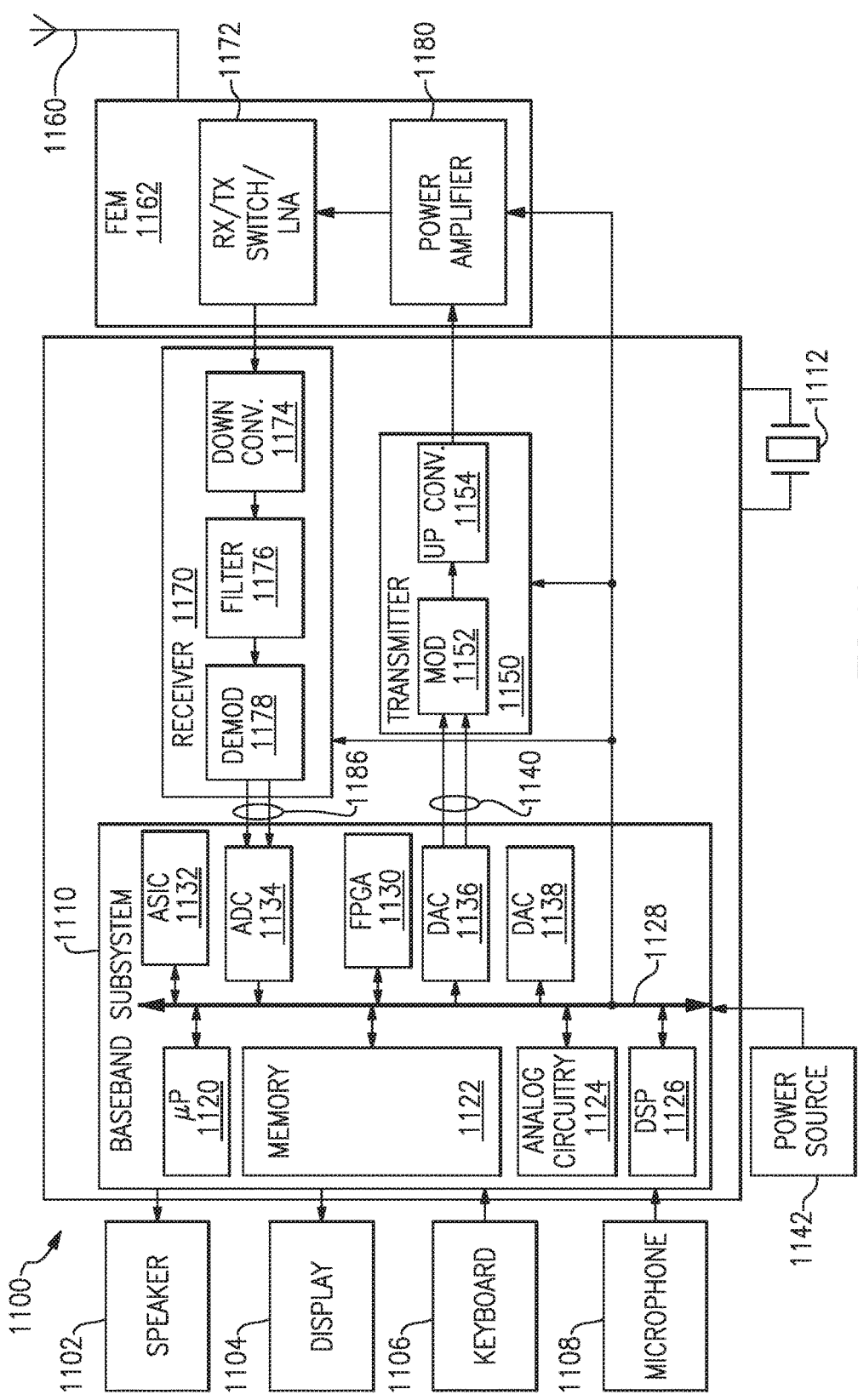
FIG. 11 is an exemplary block diagram illustrating a simplified wireless device, according to certain embodiments

FIG. 11 is an exemplary block diagram illustrating a simplified wireless device 1100 including an embodiment of the front end module 400, 700. In an embodiment, the wireless device 1100 comprises a portable transceiver, a cell phone, a smartphone, a tablet, a computer/laptop w/wireless, a pager, a global positioning system, a wireless access point, a Wi-Fi access point, a wearable device, and the like.

The wireless device 1100 includes a speaker 1102, a display 1104, a keyboard 1106, and a microphone 1108, all connected to a baseband subsystem 1110. A power source 1142, which may be a direct current (DC) battery or other power source, is also connected to the baseband subsystem 1110 to provide power to the wireless device 1100. In a particular embodiment, wireless device 1100 can be, for example but not limited to, a portable telecommunication device such as a mobile cellular-type telephone. The speaker 1102 and the display 1104 receive signals from baseband subsystem 1110, as known to those skilled in the art. Similarly, the keyboard 1106 and the microphone 1108 supply signals to the baseband subsystem 1110.

The baseband subsystem 1110 includes a microprocessor (μP) 1120, memory 1122, analog circuitry 1124, and a digital signal processor (DSP) 1126 in communication via bus 1128. Bus 1128, although shown as a single bus, may be implemented using multiple busses connected as necessary among the subsystems within the baseband subsystem 1110. The baseband subsystem 1110 may also include one or more of an application specific integrated circuit (ASIC) 1132 and a field programmable gate array (FPGA) 1130.

The microprocessor 1120 and memory 1122 provide the signal timing, processing, and storage functions for wireless device 1100. The analog circuitry 1124 provides the analog processing functions for the signals within baseband subsystem 1110. The baseband subsystem 1110 provides control signals to a transmitter 1150, a receiver 1170, and a power amplifier 1180, for example.

It should be noted that, for simplicity, only the basic components of the wireless device 1100 are illustrated herein. The control signals provided by the baseband subsystem 1110 control the various components within the wireless device 1100. Further, the function of the transmitter 1150 and the receiver 1170 may be integrated into a transceiver.

The baseband subsystem 1110 also includes an analog-to-digital converter (ADC) 1134 and digital-to-analog converters (DACs) 1136 and 1138. In this example, the DAC 1136 generates in-phase (I) and quadrature-phase (Q) signals 1140 that are applied to a modulator 1152. The ADC 1134, the DAC 1136, and the DAC 1138 also communicate with the microprocessor 1120, the memory 1122, the analog circuitry 1124, and the DSP 1126 via bus 1128. The DAC 1136 converts the digital communication information within baseband subsystem 1110 into an analog signal for transmission to the modulator 1152 via connection 1140. Connection 1140, while shown as two directed arrows, includes the information that is to be transmitted by the transmitter 1150 after conversion from the digital domain to the analog domain.

A crystal 1112 supplies clock information for the wireless device 1100.

The transmitter 1150 includes the modulator 1152, which modulates the analog information on connection 1140 and provides a modulated signal to upconverter 1154. The upconverter 1154 transforms the modulated signal to an appropriate transmit frequency and provides the upconverted signal to the power amplifier 1180. The power amplifier 1180 amplifies the signal to an appropriate power level for the system in which the wireless device 1100 is designed to operate. In an embodiment, the power amplifier 1180 comprises the power amplifier module 10.

Details of the modulator 1152 and the upconverter 1154 have been omitted, as they will be understood by those skilled in the art. For example, the data on connection 1140 is generally formatted by the baseband subsystem 1110 into in-phase (I) and quadrature (Q) components. The I and Q components may take different forms and be formatted differently depending upon the communication standard being employed.

A front end module 1162 comprises the power amplifier 1180 and a TX/RX switch/low noise amplifier (LNA) circuit 1172. In an embodiment, the switch/low noise amplifier circuit 1172 comprises the TX/RX switch/low noise amplifier module 46 with transmit/loopback architecture.

In an embodiment, the front end module 1162 comprises the front end module 400, 700. In an embodiment, front end module 1162 comprises a front end integrated circuit (FEIC).

The power amplifier 1180 supplies the amplified transmit signal to the switch/low noise amplifier circuit 1172. The transmit signal is supplied from the front end module 1162 to the antenna 1160 when the switch is in the transmit mode.

A signal received by antenna 1160 will be directed from the switch/low noise amplifier 1172 of the front end module 1162 to the receiver 1170 when the switch is in the receive mode. The low noise amplifier circuitry 1172 amplifies the received signal.

If implemented using a direct conversion receiver (DCR), the downconverter 1174 converts the amplified received signal from an RF level to a baseband level (DC), or a near-baseband level (approximately 100 kHz). Alternatively, the amplified received RF signal may be downconverted to an intermediate frequency (IF) signal, depending on the application. The downconverted signal is sent to the filter 1176. The filter 1176 comprises a least one filter stage to filter the received downconverted signal as known in the art.

The filtered signal is sent from the filter 1176 to the demodulator 1178. The demodulator 1178 recovers the transmitted analog information and supplies a signal representing this information via connection 1186 to the ADC 1134. The ADC 1134 converts these analog signals to a digital signal at baseband frequency and transfers the signal via bus 1128 to the DSP 1126 for further processing.

Terminology

Some of the embodiments described above have provided examples in connection with mobile phones. However, the principles and advantages of the embodiments can be used for any other systems or apparatus that have needs for power amplifier systems.

Such a system or apparatus can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone such as a smart phone, a telephone, a television, a computer monitor, a computer, a hand-held computer, a laptop computer, a tablet computer, a personal digital assistant (PDA), a PC card, a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods, apparatus, and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of operating a front end module having transmit loopback functionality, the method comprising:
   conducting on a transmit loopback path a loopback signal from an output of a power amplifier to a receive port, the transmit loopback path including a power coupler, an attenuator, and a first switch, the power coupler coupled between the output of the power amplifier and an input of the attenuator, the first switch coupled between an output of the attenuator and the receive port; and
   conducting on a receive path a radio frequency receive signal from an antenna port to the receive port, the receive path including a second switch coupled between the antenna port and the receive port, the receive path without the first switch.

2. The method of claim 1 further comprising tapping, with the power coupler, a portion of the transmit loopback signal and attenuating, with the attenuator, the portion of the transmit loopback signal.

3. The method of claim 1 wherein the transmit loopback path and the receive path share a common signal path between the receive port, a first end of the first switch, and a first end of the second switch.

4. The method of claim 1 further comprising closing the first switch and opening the second switch when the front end module operates in a transmit mode.

5. The method of claim 1 further comprising opening the first switch and closing the second switch when the front end module operates in a receive mode.

6. A method of operating a front end module having transmit loopback functionality, the method comprising:
   passing a loopback signal in a transmit loopback path to a receive port of the front end module when the front end module is operating in a transmit mode, the transmit loopback path including a power coupler coupled between a power amplifier and an attenuator, and a first switch coupled between the attenuator and the receive port, the first switch configured to interrupt the transmit loopback path when the front end module is operating in a receive mode; and passing a radio frequency receive signal with a second switch in a receive path to the receive port when the front end module is operating the receive mode, the second switch configured to interrupt the receive path when the front end module is operating in the transmit mode, the receive path being free from the first switch.

7. The method of claim 6 further comprising tapping a portion of the loopback signal with the power coupler and attenuating the portion of the loopback signal with the attenuator.

8. The method of claim 6 wherein the transmit loopback path and the receive path share a common signal path between the receive port, a first end of the first switch, and a first end of the second switch.

9. A method of operating a front end module having transmit loopback functionality, the method comprising:
  closing a first switch in communication with an attenuator and a receive port, tapping with a power coupler in communication with a power amplifier and the attenuator a portion of a signal from an output of the power amplifier, and attenuating with the attenuator the portion in a transmit loopback path, and opening a second switch in a receive path when the front end module is operating a transmit mode, the first switch configured to pass a loopback signal from the output of the power amplifier to the receive port of the front end module and the second switch configured to interrupt the receive path when the front end module is operating in the transmit mode; and
  opening the first switch in the transmit loopback path and closing the second switch in the receive path when the front end module is operating in a receive mode, the first switch configured to interrupt the transmit loopback path and the second switch configured to pass a receive signal from an antenna port of the front end module to the receive port when the front end module is operating in the receive mode, the receive path independent of the first switch.

10. The method of claim 9 wherein the transmit loopback path and the receive path share a common signal path between the receive port, a first end of the first switch, and a first end of the second switch.

11. The method of claim 9 further comprising closing a third switch and opening the first and second switches when the front end module operates in a low noise amplifier bypass mode, the third switch configured to bypass the low noise amplifier and the second switch when the front end module is operating in the low noise amplifier bypass mode.

12. The method of claim 11 wherein the transmit loopback path and the receive path share a common signal path between the receive port, a first end of the first switch, a first end of the second switch, and a first end of the third switch.

13. A method of operating a wireless device having transmit loopback functionality, the method comprising:
  transmitting and receiving with an antenna radio frequency signals;
  amplifying with a power amplifier a radio frequency signal for transmission by the antenna;
  amplifying with a low noise amplifier a radio frequency signal received by the antenna;
  operating in a transmit mode that includes closing a first switch coupled between an attenuator and a receive port, tapping with a power coupler coupled between the power amplifier and an attenuator a portion of an output signal from the power amplifier, and attenuating with the attenuator the portion in a transmit loopback path of a front end module, and opening a second switch in a receive path of the front end module, the first switch configured to pass a loopback signal from the output of the power amplifier to a receive port of the front end module; and
  operating in a receive mode that includes opening the first switch in the transmit loopback path and closing the second switch in the receive path, the second switch configured to pass a receive signal from an antenna port of the front end module to the receive port, the receive path independent of the first switch.

14. The method of claim 13 wherein the radio frequency receive signal does not pass through the first switch.

15. The method of claim 13 further comprising interrupting the loopback signal path when the front end module is operating in the receive mode.

16. The method of claim 15 wherein the first switch is configured to interrupt the loopback signal path when the front end module is operating in the receive mode.

17. The method of claim 13 further comprising interrupting the receive signal path when the front end module is operating is the transmit mode.

18. The method of claim 17 wherein the second switch is configured to interrupt the receive signal path when the front end module is operating in the transmit mode.

19. The method of claim 13 further comprising splitting with a splitter the radio frequency receive signal for license assist access operation.

* * * * *